(12) United States Patent
Roa-Espinosa et al.

(10) Patent No.: US 9,688,586 B1
(45) Date of Patent: Jun. 27, 2017

(54) MODIFIED FERTILIZER AND A METHOD OF MANUFACTURING THEREOF

(71) Applicants: Aicardo Roa-Espinosa, Madison, WI (US); Hailin Lin, Guangzhou (CN); Jie Yan, Gongzhou (CN)

(72) Inventors: Aicardo Roa-Espinosa, Madison, WI (US); Hailin Lin, Guangzhou (CN); Jie Yan, Gongzhou (CN)

( * ) Notice: Subject to any disclaimer, the term of this patent is extended or adjusted under 35 U.S.C. 154(b) by 0 days.

(21) Appl. No.: 15/261,963

(22) Filed: Sep. 11, 2016

(51) Int. Cl.
*C05G 3/00* (2006.01)
*C05C 9/00* (2006.01)

(52) U.S. Cl.
CPC ............ *C05G 3/0029* (2013.01); *C05C 9/005* (2013.01); *C05G 3/0041* (2013.01)

(58) Field of Classification Search
CPC .................................................. C05G 3/0029
See application file for complete search history.

(56) References Cited

U.S. PATENT DOCUMENTS

| 8,845,775 B2* | 9/2014 | Schaafsma | C05G 3/0029 106/243 |
| 8,906,451 B2* | 12/2014 | Fujii | A01N 25/26 427/217 |
| 9,422,663 B1* | 8/2016 | Roa-Espinosa | D21C 9/001 |
| 2012/0231171 A1* | 9/2012 | Roa-Espinosa | C05B 7/00 427/385.5 |
| 2013/0039965 A1* | 2/2013 | Fujii | C05G 3/0029 424/419 |

* cited by examiner

Primary Examiner — Wayne Langel
(74) Attorney, Agent, or Firm — Steven H Greenfield; Greenfield Invention and Patent Consulting, Inc.

(57) ABSTRACT

A modified fertilizer structure and a process for making the structure are disclosed. The structure contains at least a first modified oil layer that coats the fertilizer particle. Additional layers may be added as necessary to include a modified fiber layer that coats the modified oil layer, a second and third modified oil layers, a second modified fiber layer, a layer of diatomaceous earth mineral particles and a superabsorbent layer. The structure may be constructed by placing fertilizer particles in a rotating drum, then adding the materials for each layer consecutively into the drum at appropriate conditions. The modified fertilizer structure is configured to gradually release the nutrients into the soil over a desired period of time.

8 Claims, 2 Drawing Sheets

MODIFIED FERTILIZER AND A METHOD OF MANUFACTURING THEREOF

FIELD OF THE INVENTION

The present invention relates to a chemically modified fertilizer and a method to manufacture the fertilizer. More specifically, the present invention relates to a fertilizer structure configured to release nutrients to the soil and to the plants at a controlled rate that is substantially slower than that of typical fertilizers currently in use.

BACKGROUND OF THE INVENTION

Fertilizers are commonly used to provide nutrients essential to the growth of plants. They m be in a granule or powder form and may be applied to the soil or to plant tissues. Fertilizers may contain in varying proportions the following nutrients: Nitrogen (N), Phosphorus (P), Potassium (K), Calcium (Ca), Magnesium (Mg), Sulfur (S), Copper (Cu), Manganese (Mn), Iron (Fe), Zinc (Zn) and Boron (B). The list of commonly used fertilizers includes, but is not limited to, calcium sulfate, urea, calcium nitrate, calcium ammonium nitrate, potassium chloride, potassium nitrate, magnesium ammonium phosphate (referred to as struvite), iron phosphate, ammonium phosphate and ammonium sulfate nitrate.

The application of fertilizers, while beneficial to plants, also pose significant risks. Applied in excess, fertilizers may be poisonous to plants and also contaminate the subsurface water. The effectiveness of fertilizers is degraded through oxidation, evaporation and leaching into ground water. Microbes also degrade fertilizers by immobilization or oxidation.

One solution to the fertilizer loss of effectiveness is to change the chemical formulation and apply coatings onto the fertilizer particles to control the rate of release of the nutrients into the soil. Ideally, the nitrogen release time in slow release fertilizers is about one month. Slow release fertilizers vary in effectiveness, but few achieve this release rate.

SUMMARY OF THE PRESENT INVENTION

It is the object of the present invention to provide a fertilizer particle structure configured to release its nutrients to the soil that is accessible to the plant roots and leaves in a controlled manner.

More specifically, it is the object of the present invention to provide a modified nitrogen-containing fertilizer particle that releases 90% of the nitrogen to the soil that is accessible to the plant roots and leaves over a period of about one month.

In one aspect of the present invention, a modified fertilizer structure contains a core particle containing nutrients for enhancing plant growth, the core particle having an outer surface; and a first layer comprising a crosslinked polymer made from reacting an oil in the presence of iodine, the polymer having an iodine value of at least 117, a viscosity of between about 400 centipoise and about 900 centipoise and a degree of crosslinking of at least 5%, the first layer over-coating the outer surface of the core particle.

In another aspect of the present invention a process for manufacturing a modified fertilizer structure comprises the step of: providing fertilizer particles in a rotating drum; preparing a modified oil material by heating raw oil to a temperature of between about 160° C. and 200° C. for about 1 to 5 hours in the presence of iodine; adding the modified oil to the drum; and turning the drum for a sufficient period of time until the fertilizer particles are fully coated with the modified oil to create a first modified oil layer overcoat.

These and other features, aspects and advantages of the present invention will become better understood with reference to the following drawings, description and claims.

DETAILED DESCRIPTION OF THE INVENTION

Figure 1:
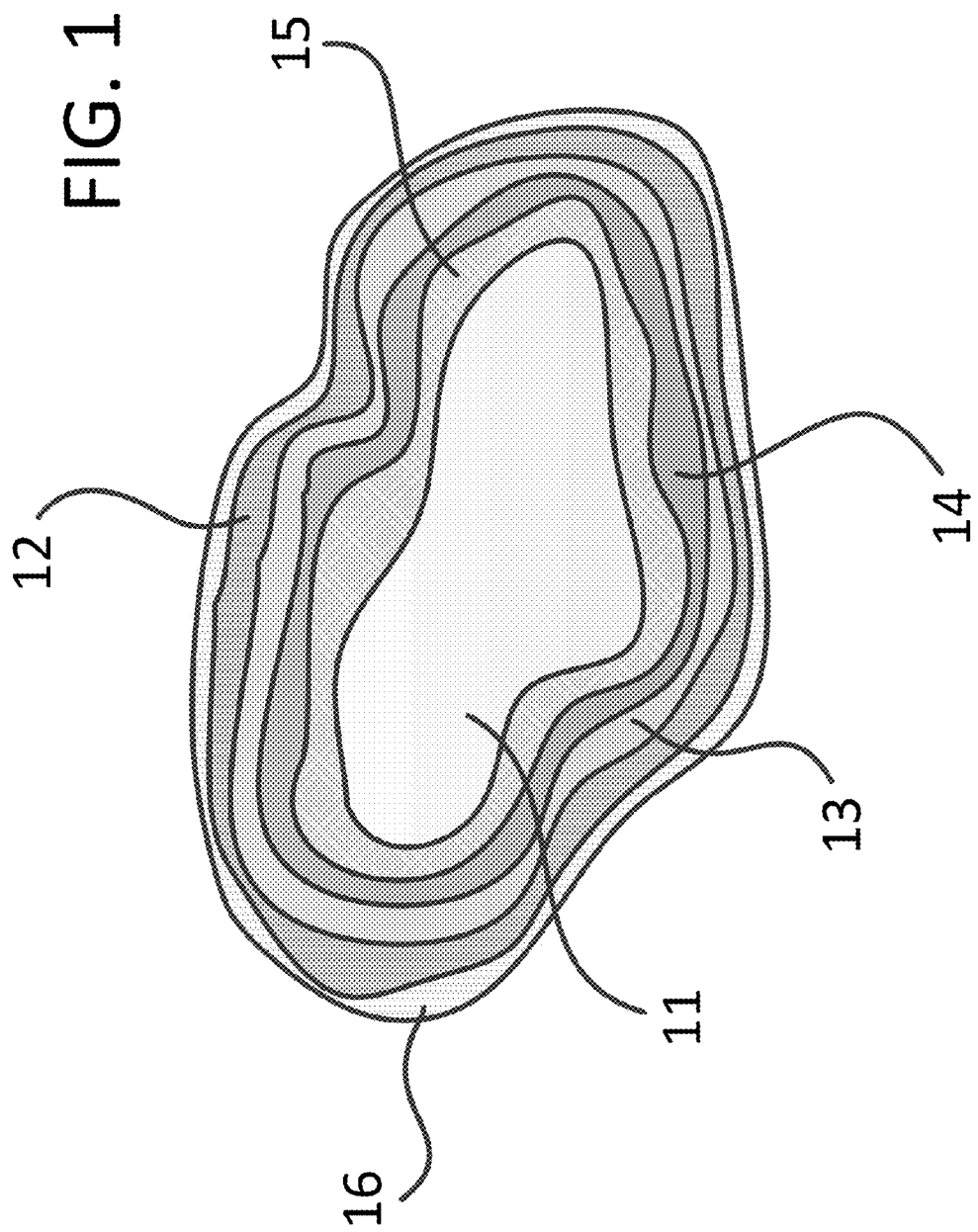
FIG. 1 is an illustration of the modified fertilizer structure according to an embodiment of the present invention.

The following detailed description is of the best currently contemplated modes of carrying out exemplary embodiments of the invention. The description is not to be taken in a limiting sense, but is made merely for the purpose of illustrating the general principles of the invention.

The modification of the fertilizer particles is accomplished by coating the particles with at least one layer of materials that have a higher degree of hydrophobicity and/or oil absorbency than that of the fertilizer particles. In one embodiment of the present invention, as many as seven layers are coated onto the fertilizer particles. Each layer is coated over another previously coated layer. Each layer is configured to progressively slow the nutrient release from the fertilizer into the soil. This provides a way to tailor a rate of release that is best suited for a particular soil. However, for urea fertilizers, a desirable goal for many types of soils is a rate of nitrogen release of 90% of the nitrogen contained in the urea over a period of one month.

The first overcoat layer comprises modified oil made by heating unsaturated vegetable or waste oil having between 12 and 20 carbon atoms to between about 160° C. and 200° C. for about 1 to 5 hours using iodine as a catalyst. The reaction results in a polymerized and crosslinked oil having an iodine value of at least 117 and preferably at least 120, a degree of crosslinking of at least 5% and a viscosity of between about 400 centipoise and 900 centipoise which represents about a 10 to 15 fold increase relative to unsaturated vegetable or waste oil. The higher the iodine value of the oil, the greater its degree of unsaturation. The modified oil is applied at between about 1% to about 2% by weight of fertilizer particles. The modified oil layer typically has a dark color.

A variety of vegetable oils fall within the scope of the present invention including but not limited to: cotton seed oil, wheat germ oil, soybean oil, sunflower oil, linseed oil, canola oil, and corn oil.

The viscosity of the modified oil can be controlled by the amount of iodine catalyst used in the reaction which may range from about 0.5% to about 1% by weight of the unmodified oil. The higher the percent iodine, the higher the degree of the resulting conjugated double bonds that form in the oil. The conjugated double bonds correlate with higher modified oil viscosity and slower rate of fertilizer release.

A second overcoat layer that covers the first overcoat layer is made of modified fibers. Raw fibers may be cut and/or macerated to a size of between about 50 microns to about 100 microns. The shortened fibers then chemically treated as follows:

1. Dissolving the fibers in Dimethylformamide at a 1:10 volumetric ratio.
2. Adding 4-dinethylaminopyridine as catalyst at about 0.3% by weight of the fibers.
3. Reacting the mixture of fibers and catalyst with acetic anhydride at a weight ratio of 1 to between about 0.5 to 1.0 fibers to acetic anhydride at a temperature of between about 80° C. and about 100° C.
4. Washing the products of the reaction to remove any residual chemicals and then drying. The resulting modified fiber product materials will generally be in particulate form.
5. Applying reacted mixture onto the modified oil first overcoat layer at between about 10% to about 20% by weight of the fertilizer. This may be accomplished by mixing the modified oil coated fertilizer with the modified fiber material in a turning drum or by spraying the modified fibers in a dry form onto the modified oil coated fertilizer.

It is preferable that the raw fibers used for making the modified fiber layer contain at least 40% cellulose. Suitable fibers include but are not limited to straw, cotton, wheat, barley, wood and manure.

The preparation of the macerated fiber of the present invention maybe done in accordance with embodiments described in U.S. Pat. No. 9,422,663.

A third layer may comprise of modified oil prepared in a similar manner as the modified oil of the first layer. Depending on the rate of fertilizer release of the first and second layers, it may be desirable to make the modified oil of the third layer at a lower viscosity than that of the first.

A fourth layer may be a modified fiber layer similar to that of the second layer. The fourth layer may be coated onto the third layer which constitutes modified oil.

A fifth layer may be a modified oil layer similar to that of the third layer. The fifth layer may be coated onto the fourth layer that constitutes modified fiber.

If necessary, diatomaceous earth mineral particles such as clay and zeolite may be applied on the modified oil which constitutes the fifth overcoat layer, to form a sixth overcoat layer.

Finally, a superabsorbent solution may be applied to the sixth layer to form a seventh layer. A sodium or potassium acrylate monomer mixed with ammonium zirconium carbonate is applied at a rate of between about 0.1% and 1% by weight of the fertilizer. The ammonium zirconium carbonate is a curing agent that catalyzes the acrylate to polymerize and crosslink to a degree of crosslinking of about 5%. The crosslinking may be done at ambient temperatures or by heating to between about 100° F. and about 180° F. which speeds up the reaction. The heating crosslinks and dries the crosslinked polymer to produce a solid layer which overcoats the diatomaceous earth mineral layer. Coating of the superabsorbent monomer may be accomplished by mixing with the six-layer coated fertilizer in a drum, or by spraying it onto the six-layer coated fertilizer particles. The superabsorbent solution may have a concentration of between about 5% and about 25% by weight and the ammonium zirconium carbonate comprises between about 1 percent to about 5 percent by weight of the superabsorbent monomer.

For the most part, at least the first two layers are applied. The third through the seventh layer are optional depending on the desired rate of fertilizer release to be achieved. It is also noted that coating the layers in different sequences than that described above also falls within the scope of the present invention.

The superabsorbent layer prepared in this manner is capable of absorbing water at a rate of between about 5 to about 20 times its own weight. The water absorbed into the superabsorbent layer is in the form of a gel and is a barrier to slow fertilizer release. The liquid super absorbent coating layer may further contain micronutrients, insecticides, bacteria and herbicides to add to the soil as desired.

Another material that may be used in any of the coating layers is wood lignin.

Figure 2:
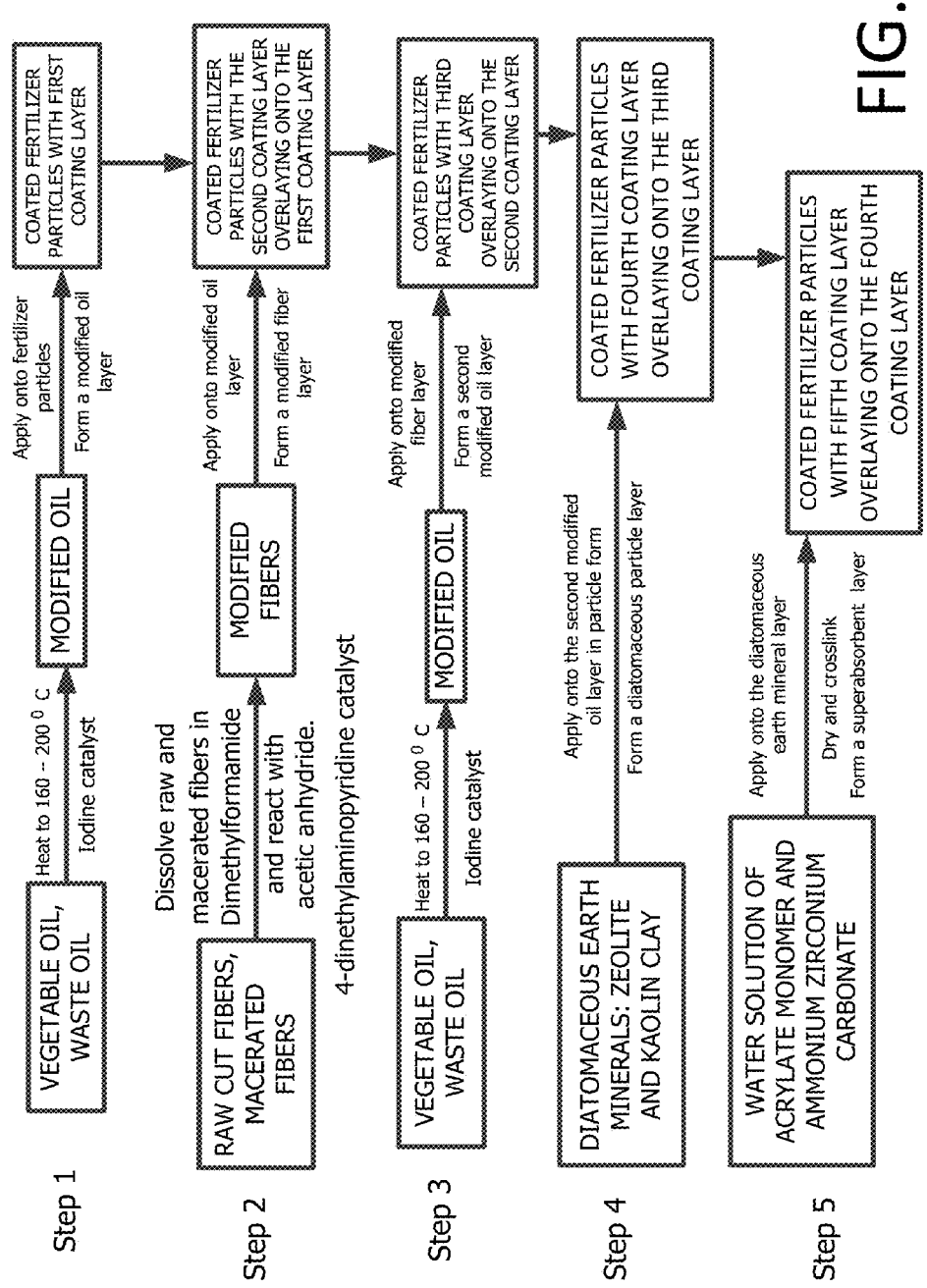
FIG. 2 is a schematic of the process of manufacturing a slow release fertilizer according to an embodiment of the present invention.

FIG. 1 illustrates the layer structure of an embodiment of the present invention. Layer 15 is the first modified oil overcoat that covers the fertilizer particle 11. The modified fiber layer 14 coats the first modified oil overcoat, the second modified oil layer 13 covers the modified fiber layer 14, the layer containing diatomaceous mineral particles 12 coats the second modified oil layer 13 and superabsorbent layer 16 covers the layer containing diatomaceous mineral particles 12. FIG. 2 is a schematic and description of a five step process to coat the five layers shown in FIG. 1 one on top of the other.

The thickness of each layer coated one on top of the other to create a barrier that slows the release of the fertilizer chemicals into the soil ranges from about 0.2 mm to about 0.4 mm.

It should be understood, of course, that the foregoing relates to exemplary embodiments of the invention and that modifications may be made without departing from the spirit and scope of the invention.

EXAMPLES

The examples below show nitrogen release rates for urea fertilizer coated with four layers in the order of: a first modified oil layer made using varying levels of iodine, a first modified fiber layer, a second modified oil layer and a second modified fiber layer. Equivalent tests may be used to measure the rate of release of other nutrients into the soil from various fertilizers. These tests are specifically useful for fertilizers that do not contain nitrogen.

Example 1

Five kilogram of urea having a particle size of between about 2 mm to about 3 min in diameter are placed in a drum. 0.17 kg of modified vegetable oil made with iodine at 0.05%, a reaction time of 1.5 hours and at a temperature of 160° C. is added into the drum and the contents mixed by the drum rotating for 5-10 minutes until the modified oil covers the fertilizer. Then, 0.34 kg of modified straw was gradually added by step to the drum and the drum rotated for about 5-10 minutes until the modified fiber covered the surface of the modified oil layer. This produces a urea fertilizer having two layer coated onto it: a first modified oil layer and a second modified fiber layer. The process is then repeated such that a second modified oil layer and a second modified fiber layer are applied in the same way as the first sequence. The coated fertilizer was placed in 25° C. water and the nitrogen release into the water was measured over a period of one month. Table 1 below shows the results:

TABLE 1

| | Release days | | | | | | | |
|---|---|---|---|---|---|---|---|---|
| | 1 | 2 | 5 | 7 | 14 | 20 | 28 | 30 |
| % N released | 0.05 | 1.18 | 8.46 | 23.8 | 34.6 | 50.7 | 67.4 | 93.8 |

Example 2

Five kilogram of urea having a particle size of between about 2 mm to about 3 mm in diameter are placed in a drum. 0.17 kg of modified vegetable oil made with iodine at 0.1%, a reaction time of 1.5 hours and at a temperature of 160° C. is added into the drum and the contents mixed by the drum rotating for 5-10 minutes until the modified oil covers the fertilizer. Then 0.34 kg of modified straw was gradually added by step to the drum and the drum rotated for about 5-10 minutes until the modified fiber covered the surface of the modified oil layer. This produces a urea fertilizer having two layer coated onto it: a first modified oil layer and a second modified fiber layer. The process is then repeated such that a second modified oil layer and a second modified fiber layer are applied in the same way as the first sequence. The coated fertilizer was placed in 25° C. water and the nitrogen release into the water was measured over a period of one month. Table 2 below shows the results:

TABLE 2

| | Release day (d) | | | | | | | |
|---|---|---|---|---|---|---|---|---|
| | 1 | 2 | 5 | 7 | 14 | 20 | 28 | 30 |
| N released (%) | 0.03 | 1.07 | 8.13 | 22.2 | 31.8 | 49.5 | 65.1 | 92.5 |

Example 3

Five kilogram of urea having a particle size of between about 2 mm to about 3 mm in diameter are placed in a drum. 0.17 kg of modified vegetable oil made with iodine at 0.2%, a reaction time of 1.5 hours and at a temperature of 160° C. is added into the drum and the contents mixed by the drum rotating for 5-10 minutes until the modified oil covers the fertilizer. Then 0.34 kg of modified straw was gradually added by step to the drum and the drum rotated for about 5-10 minutes until the modified fiber covered the surface of the modified oil layer. This produces a urea fertilizer having two layer coated onto it: a first modified oil layer and a second modified fiber layer. The process is then repeated such that a second modified oil layer and a second modified fiber layer are applied in the same way as the first sequence. The coated fertilizer was placed in 25° C. water and the nitrogen release into the water was measured over a period of one month. Table 3 below shows the results:

TABLE 3

| | Release day (d) | | | | | | | |
|---|---|---|---|---|---|---|---|---|
| | 1 | 2 | 5 | 7 | 14 | 20 | 28 | 30 |
| N released (%) | 0.01 | 0.98 | 8.02 | 20.7 | 31.6 | 47.2 | 63.4 | 90.7 |

Example 4

Five kilogram of urea having a particle size of between about 2 mm to about 3 mm in diameter are placed in a drum. 0.17 kg of modified vegetable oil made with iodine at 0.3%, a reaction time of 1.5 hours and at a temperature of 160° C. is added into the drum and the contents mixed by the drum rotating for 5-10 minutes until the modified oil covers the fertilizer. Then 0.34 kg of modified straw was gradually added by step to the drum and the drum rotated for about 5-10 minutes until the modified fiber covered the surface of the modified oil layer. This produces a urea fertilizer having two layer coated onto it: a first modified oil layer and a second modified fiber layer. The process is then repeated such that a second modified oil layer and a second modified fiber layer are applied in the same way as the first sequence. The coated fertilizer was placed in 25° C. water and the nitrogen release into the water was measured over a period of one month. Table 4 below shows the results:

TABLE 4

| | Release day (d) | | | | | | | |
|---|---|---|---|---|---|---|---|---|
| | 1 | 2 | 5 | 7 | 14 | 20 | 28 | 30 |
| N released (%) | 0.008 | 0.97 | 7.33 | 19.4 | 28.4 | 45.5 | 60.8 | 85.5 |

We claim:

1. A modified fertilizer structure containing:
   a core particle containing nutrients for enhancing plant growth, said core particle having an outer surface; and
   a first layer comprising a crosslinked polymer made from reacting an oil in the presence of iodine, said polymer having an iodine value of at least 117, a viscosity of between about 400 centipoise and about 900 centipoise and a degree of crosslinking of at least 5%, said first layer over-coating the outer surface of the core particle;
   a second layer covering an outer surface of the first layer, said second layer comprising modified fibers, said modified fibers being made by reducing raw fibers to a size of between about 50 microns to about 100 microns, dissolving the reduced size fibers in Dimethylformamide, and reacting the reduced size fibers dissolved in Dimethylformamide with acetic anhydride at a temperature of about 80° C. to about 100° C. in the presence of about 0.3% 4-dinethylaminopyridine by weight of the fibers.

2. The modified fertilizer structure of claim 1, further comprising a third layer, said third layer covering an outer surface of the second layer, said third layer comprising modified oil.

3. The modified fertilizer structure of claim 2, wherein the modified oil of the third layer comprises a crosslinked polymer made by reacting an unsaturated vegetable or waste oil in the presence of iodine, said polymer having an iodine value of at least 117, a viscosity of between about 400 centipoise and about 900 centipoise and a degree of crosslinking of at least 5%.

4. The modified fertilizer structure of claim 2 further comprising:
   a fourth layer that overcoats an outer surface of the third layer, said fourth layer comprising modified fibers; and
   a fifth layer covering an outer surface of the fourth layer, said fifth layer comprising modified oil.

5. The modified fertilizer structure of claim 4, further comprising a sixth layer covering an outer surface of the fifth layer, said sixth layer comprising diatomaceous earth mineral particles.

6. The modified fertilizer structure of claim 5, further comprising a seventh layer covering an outer surface of the sixth layer, said seventh layer comprising a crosslinked superabsorbent.

7. The modified fertilizer structure of claim 6, wherein the crosslinked superabsorbent is made by applying a polyacrylate monomer salt mixed with ammonium zirconium carbonate to an outer surface of the sixth layer, then drying and curing the polyacrylate monomer salt in situ, said polyacrylate monomer salt constituting sodium or potassium acrylate.

8. The modified fertilizer structure of claim 7 wherein the seventh layer further comprises materials beneficial to the soil, said materials comprising micronutrients, bacteria, insecticides and herbicides.

* * * * *